P. C. VAN SLYKE.
SORGHUM EVAPORATOR.
No. 57,224.
PATENTED AUGUST 14, 1866.
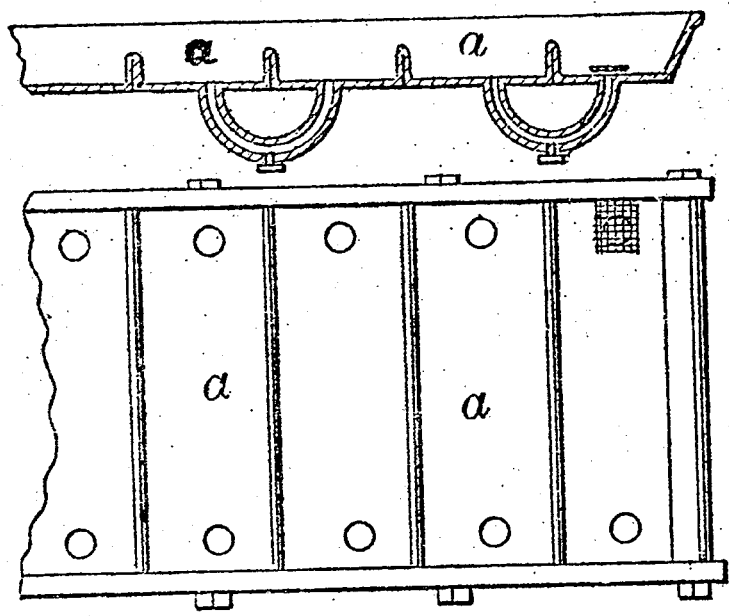
TAKEN FROM PATENT OFFICE REPORT.
1866 - VOL. III.
ONLY DRAWING ACCESSIBLE (1916)

UNITED STATES PATENT OFFICE.

P. C. VAN SLYKE, OF BLOOMFIELD, INDIANA.

IMPROVED SORGHUM-EVAPORATOR.

Specification forming part of Letters Patent No. 57,224, dated August 14, 1866.

*To all whom it may concern:*

Be it known that I, P. C. VAN SLYKE, of Bloomfield, in the county of Greene and State of Indiana, have invented a new and useful Improvement in Sorghum-Evaporators; and I do hereby declare that the following is a full, clear, and exact description thereof, which will enable others skilled in the art to make and use the same, reference being had to the accompanying drawings, forming a part of this specification, in which—

Figure 1 is a plan view of an evaporator made according to my invention. Fig. 2 is a section on the line $x$, Fig. 1.

Similar letters of reference indicate like parts.

The object of this invention is to improve the construction of evaporators for sorghum-sirup so as to promote crystallization and the production of sugar.

The evaporator is divided by partitions into numerous divisions, each of which is perforated near the opposite sides of the vessel, to receive the ends of curved pipes, which go from one division to the next under their bottoms, through which pipes the sirup passes in going from one division to another. These pipes do not connect each division at each of their ends, but only at alternate ends, so as to make the sirup run from end to end of each division in order to reach the place where it is discharged into the next.

The letter A designates the evaporating-pan with its divisions B, which are formed by low partitions, (seen most clearly in the sectional view,) the divisions extending across the evaporator from side to side.

The furnace is not here shown, but it should be so placed that the pipes C D will not be exposed to the energy of the fire. Each division B of the pan is perforated at each end through its bottom, to receive pipes C D, which extend in alternate order from one division to the next adjacent below the pan, the pipes C connecting the first two divisons, counting from the left, and then the next two, and so on to the end, and the pipes D connecting the second and third, fourth and fifth, and so on to the end. It results from this construction that the sirup will enter the second division on the left by the pipe C, and will be compelled to cross the pan, running the whole length of the division before it reaches the discharge-pipe D, which conducts it into the third division. The sirup is conducted in this manner throughout the whole length of the pan.

The object of this arrangement is to keep the sirup as long a time as possible exposed to the heat of the furnace.

The pipes C D are curved down below the pan, and their ends consequently enter the bottoms of the divisions and are properly secured. The lowest part of each pipe is perforated, and has a plug fitted in the perforation, which can be withdrawn to remove sediment and obstructions.

I am aware that evaporators have been made with divisions whose partitions have been perforated to allow the sirup to run from one to the other, and that they have been made with horizontal pipes leading from one division to the next outside of the side walls of the pan. I disclaim such constructions.

The pipes in my pan leave and enter the pan in vertical lines, and are conducted from the bottom of one division to the bottom of another below the pan, and consequently they remain full of sirup so long as the bottoms of the divisions are covered.

The scum will not escape from one division to another, because only the heaviest part of the sirup will be found in the pipes, and will not be subjected to as violent ebullition as the rest of the sirup, even if directly exposed to the fire, because of the pressure made thereon by the column of sirup above it in the several divisions.

The greatest success in purifying and separating the scum in the treatment of sorghum-sirup is had when violent ebullition is established in a shallow vessel the greater the depth of sirup the less successful the result.

By means of my invention I can work with only one-fourth inch in depth of juice in the pan, separating successfully all impurities developed in process of boiling, even to the waxy foam that rises on the molasses, and which, if not separated, prevents or retards granulation. In order to remove sediment from the pipes C D, I perforate them at their lowest points and fit plugs E in their perforations.

I claim as new and desire to secure by Letters Patent—

1. In evaporators, connecting their divisions by pipes running from one to the other below their bottoms, substantially as described.

2. Perforating the connecting-pipes at their lowest points, substantially as described.

P. C. VAN SLYKE.

Witnesses:
E. H. C. CAVINS,
J. D. KILLIAN.